United States Patent
Burks

(10) Patent No.: US 10,618,657 B2
(45) Date of Patent: Apr. 14, 2020

(54) RECONFIGURABLE AIRCRAFT SEAT ARRANGEMENT

(71) Applicant: United Aerospace Limited, Pembrokeshire (GB)

(72) Inventor: Gareth Burks, Dyfed (GB)

(73) Assignee: United Aerospace Limited, Pembrokeshire (GB)

( * ) Notice: Subject to any disclaimer, the term of this patent is extended or adjusted under 35 U.S.C. 154(b) by 220 days.

(21) Appl. No.: 15/556,001

(22) PCT Filed: Mar. 7, 2016

(86) PCT No.: PCT/GB2016/050598
§ 371 (c)(1),
(2) Date: Sep. 6, 2017

(87) PCT Pub. No.: WO2016/142670
PCT Pub. Date: Sep. 15, 2016

(65) Prior Publication Data
US 2018/0037325 A1  Feb. 8, 2018

(30) Foreign Application Priority Data

Mar. 6, 2015 (GB) .................................. 1503809.4

(51) Int. Cl.
*B64D 11/06* (2006.01)
*B60N 2/18* (2006.01)
*B60N 2/26* (2006.01)

(52) U.S. Cl.
CPC .............. *B64D 11/064* (2014.12); *B60N 2/18* (2013.01); *B60N 2/26* (2013.01); *B64D 11/06* (2013.01); *B64D 11/0612* (2014.12)

(58) Field of Classification Search
CPC ... B64D 11/064; B64D 11/0612; B64D 11/06; B64D 11/0639; B60N 2/18; B60N 2/26; B60N 2/1803
USPC ......................................................... 297/130
See application file for complete search history.

(56) References Cited

U.S. PATENT DOCUMENTS

| 4,966,413 A * | 10/1990 | Palarski ................. A47C 1/022 297/284.6 |
| 5,553,918 A | 9/1996 | Baret et al. |
| 7,004,542 B2 * | 2/2006 | Saint-Jalmes .......... A47C 7/024 297/284.11 |

(Continued)

FOREIGN PATENT DOCUMENTS

| EP | 0105741 A2 | 4/1984 |
| EP | 0770516 A2 | 5/1997 |

(Continued)

*Primary Examiner* — Mark R Wendell
(74) *Attorney, Agent, or Firm* — Dinsmore & Shohl LLP

(57) ABSTRACT

The present invention relates to an aircraft seat arrangement that is reconfigurable between a plurality of usable configurations. The aircraft seat arrangement comprises a seat having a forward seat portion (10) and a rearward seat portion (12). The forward seat portion (10) is reconfigurable between a first configuration whereby the forward seat portion (10) is in a side by side configuration with the rearward seat portion (12), and a second configuration wherein the forward seat portion (10) is displaced to be at least partially above the rearward seat portion (12).

18 Claims, 5 Drawing Sheets

(56) References Cited

U.S. PATENT DOCUMENTS

| | | | | |
|---|---|---|---|---|
| 7,055,904 B2* | 6/2006 | Skelly | ................... | A47C 7/503 |
| | | | | 297/284.9 |
| 8,894,149 B2* | 11/2014 | Duus | ................... | B60N 2/3045 |
| | | | | 297/284.11 |
| 2005/0029846 A1* | 2/2005 | Jonas | ................... | A47C 1/023 |
| | | | | 297/284.3 |
| 2005/0062324 A1* | 3/2005 | Shimasaki | ............. | A47C 7/024 |
| | | | | 297/312 |
| 2010/0109387 A1* | 5/2010 | Merensky | .............. | A47C 7/503 |
| | | | | 297/75 |

FOREIGN PATENT DOCUMENTS

| | | | |
|---|---|---|---|
| EP | 1369350 | A1 | 12/2003 |
| FR | 2743535 | A1 | 7/1997 |
| FR | 2897020 | A1 | 8/2007 |
| JP | H07108862 | A | 4/1995 |
| WO | 2001049518 | A1 | 7/2001 |
| WO | 2012064922 | A2 | 5/2012 |

* cited by examiner

RECONFIGURABLE AIRCRAFT SEAT ARRANGEMENT

The present invention relates to an aircraft seat arrangement that is reconfigurable between a plurality of useable configurations.

Aircraft seats, and particularly aircraft passenger seats, are typically constructed of a frame made up of a number of components secured to each other by releasable securing means onto which a seat portion is positioned. A backrest is secured to the frame and in many cases is pivotable relative to the frame to enable a passenger to find a comfortable seating position. Such aircraft seats are typically found in economy class whereas business class seats may further enable the reconfiguration of the seat into a bed type structure.

There exists a problem in aircraft travel in that a significant period of time is taken in passengers embarking and disembarking the aircraft. This often has the impact of a flight missing its allocated take off time due to passengers taking their time in finding and then settling themselves into their seats. In organising their belongings and then subsequently stowing their bags they block up the aisles for further passengers attempting to find their seats. This has a significant cost implication in air travel as fewer flights can be made by a particular aircraft due to this effective downtime.

A second problem with the existing aircraft seat s a lack of room afforded to a passenger and a lack of capability of moving in order that they may avoid tension in the body caused by having to remain in the same position for a significant period of time. This effect is significantly worse for taller passengers who find that the distance between their waist and knees is close to the separation between the backrest and the seat in front meaning that they have little room to manoeuvre themselves to alternative positions and thus find travel uncomfortable.

A third problem with existing aircraft seat is that children are strapped in exactly the same position into the seat as is an adult. From the age of two onwards a child must have their own seat and for take-off and landing must be seated with the lap belt across their waist. An adult size passenger seat is clearly unsuitable for a child where the depth of the seat portion means the child's legs are straight which would cause massive damage to the child in a crash situation, and further in that the lap belt is unlikely to appropriately sit around the child's waist when they are seated.

The present invention provides an improved aircraft seat arrangement and seat.

According to the present invention there is an aircraft seat arrangement comprising a seat having a forward seat portion and a rearward seat portion, the forward seat portion reconfigurable between a first configuration whereby the forward seat portion is in a side by side configuration with the rearward seat portion, and a second configuration wherein the forward seat portion is displaced to be at least partially above the rearward seat portion.

The claimed invention solves the abovementioned problems. By at least partially displacing the forward seat portion above the rearward seat portion a space is provided in which a passenger can stand whilst they prepare to sit in the flight while other passengers are embarking. Furthermore, in the second configuration the forward seat portion provides a supporting surface onto which a passenger may sit. This supporting surface is suitable for a child to sit in a safer and more comfortable position on the seat and is also suitable for an adult who wishes to stretch their legs or move to different positions within their seat.

The aircraft seat arrangement beneficially further comprises a seat support structure for supporting the seat above an aircraft floor. The seat support structure spaces the forward and rearward seat portions away from the aircraft floor. The seat support structure beneficially comprises a plurality of support legs. This seat support structure is beneficially adapted to engage with the aircraft floor. The seat support structure is beneficially releasably engageable and is configured to be secured to standard tracks that are provided in an aircraft. Securing means are provided to secure the seat support structure to the aircraft floor.

The seat arrangement beneficially defines a seat footprint in the first configuration, and wherein the seat support structure is arranged such that in the second configuration a standing space for a person is defined within the seat footprint. This ensures there is ample room for a passenger to find their seat location and stand in a standing space without obstructing other passengers.

It will be appreciated that the seat support structure spaces the seat from the floor and projecting the seat including the forward and rearward seat portion onto the floor defines the seat footprint. The standing space is a volume defined between the floor spaces directly underneath the seat up to the underside of the seat. It will be appreciated that a standing space for a person is defined within the seat footprint but not the seat footprint in its entirety. More particularly the standing space is beneficially defined in the seat footprint beneath the forward seat portion as once the forward seat portion is displaced to be at least partially above the rearward seat portion then the effective space for passengers to stand is increased, but a passenger would still not be able to stand in the seat footprint defined by the rearward seat portion as this is beneficially in a fixed position.

In an alternative definition, the seat footprint is defined between side edges of the forward and rearward seat portions and the forward edge of the forward seat portion and the rearward edge of the rearward seat portion. The rearward edge of the rearward seat portion is beneficially provided adjacent the backrest.

The forward seat portion beneficially comprises a leading edge, and wherein there is beneficially no support structure directly beneath a portion of the leading edge. In particular there is no support structure directly beneath a portion of the leading edge. This maximises the room for a passenger. In the embodiment presented it is beneficial that the forward seat portion defines a footprint in the first configuration, and wherein there is no support structure beneath a majority of the forward seat portion footprint. It is envisaged, however, that a leading edge of the support structure may extend to or adjacent the leading edge of the forward seat portion and wherein an indent or cut-away portion is provided extending rearwardly in order that the standing space is provided. It will further be appreciated that the support structure may comprise a support member positioned adjacent the ground. Such a support member may be provided so as to stabilise the seating arrangement but minimise the interruption to a passenger standing in the seat footprint.

The leading edge of the forward seat portion beneficially overhangs the support structure.

A majority of the forward seat portion beneficially overhangs the support structure.

The forward seat portion beneficially has a forward seating surface and the rearward seat portion has a rearward seating surface, and the forward seat portion is displaceable such that in a second configuration the forward seating surface and rearward seating surface are facing each other. In the second configuration the forward and rearward seating surfaces are preferably in direct contact. The forward seat portion beneficially comprises a second seating surface in the second configuration. The second seating surface is provided on an opposing side of the seat portion to the first seating surface. Accordingly, in the second configuration the second seating surface provides support for a passenger, whether this is an adult wishing to utilise this configuration to stretch their legs for example or whether it is for a child seat.

The forward seat portion is beneficially pivotally mounted relative to the rearward seat portion. The forward seat portion is beneficially secured to a bracket, and the bracket is pivotally mounted to the support structure. The forward seat portion is beneficially fixedly secured to the bracket. The bracket is beneficially positioned to the side of the forward seat portion. It is preferred that a first and second bracket are spaced apart at opposing sides of the forward seat portion. The axis about which the forward seat portion rotates is beneficially adjacent the line at which the leading edge of the rearward seat portion and trailing edge of the forward seat portion meet. This axis of rotation is beneficially above the height of the forward and rearward seating surfaces.

The bracket beneficially comprises a stop portion for abutting the support structure in the first configuration. The stop portion beneficially abuts the support structure and prevents further forward rotation of the forward seat portion. The stop portion beneficially abuts an upper portion of a support leg of the support structure.

The aircraft seat preferably further comprises a backrest wherein the support structure comprises a platform extending forwardly from the backrest, and the rearward seat portion is supported from underneath by the platform. Beneficially, the platform is integrally formed with the backrest. It is beneficial that the platform and backrest are formed of a composite structure. The composite structure may be a monocoque structure. The provision of a platform extending forwardly from the backrest means that the rearward seat portion is supported from underneath meaning that forces onto the rearward seat portion are transferred directly through the aircraft seat. In the second configuration the force is applied directly through the forward and rearward seat portion onto the platform.

The rearward seat portion is beneficially received in a channel defined by the backrest, platform and trailing edge of the forward seat portion. The rearward seat portion is beneficially releasably received in this channel. This enables the rearward seat portion to be easily cleaned and it can easily be removed for washing. Improving the simplicity of the aircraft seat is important and the rearward seat portion may be received in the channel and is secured by an interference fit.

The support structure preferably comprises a plurality of support legs comprising at least one forward support leg and at least one rearward support leg. The forward support leg preferably extends from a location rearward of the leading edge of the forward seat portion. The legs beneficially extend downwardly from the platform. There are preferably a plurality of spaced apart legs. A first and second forward support leg are beneficially provided wherein each forward support leg comprises a longitudinal length and has a distal end, the distal end comprising an anchoring structure for anchoring the forward support leg to the floor of an aircraft, wherein the seat support structure further comprises a support member extending between the anchoring structures of the first and second support legs. By providing the anchoring structures at the distal ends of the support legs the support member extending between the anchoring structures may be positioned adjacent the floor thus having minimal effect upon a passenger when the aircraft seat is displaced to be at least partially above the rearward seat portions. Accordingly, the support member is spaced apart from the first and second seat portions. The support member preferably projects substantially perpendicular to an axis defined between the leading and trailing edges of the seat.

The support structure preferably further comprises a side portion. A bracket is beneficially mounted to the side portion. The forward extending support leg or legs are beneficially provided in this configuration to maximise the space afforded to a passenger.

At least one forward leg is preferably forwardly projecting.

A plurality of adjoined seats are beneficially provided in a side-by-side configuration. In an exemplary embodiment presented there are three seats in a side-by-side configuration however this number may be changed dependent upon particular aircraft requirements.

A pocket is beneficially provided in the leading edge of the forward seat portion. This pocket is beneficially provided in this position in order to accommodate a lifejacket for example. It will also be appreciated that access to the pocket may also be provided from the rearward edge of the forward seat portion in order that access to the lifejacket can be achieved when the seat is in the second configuration.

The backrest beneficially includes a mounting structure for mounting a seatbelt thereto. There are beneficially three mounting points for mounting a seatbelt to the aircraft seat. As such, known types of three-point harness can be accommodated which will be suitable for adults in the first configuration and children in the second configuration. It is beneficial that the backrest comprises an upper edge distal to the seat, wherein the mounting structure is closer to the upper edge than the seat. The remaining two mounting points may be provided by a bracket mounted to the side portion and/or directly mounted to a portion of the backrest which may extend forwardly from the backrest.

The present invention will now be described by an example only with reference to the accompanying drawings in which:

FIG. 1 is a schematic perspective view of an aircraft seat arrangement according to an exemplary embodiment of the present invention in a first configuration.

FIGS. 2a and b are schematic perspective views of an aircraft seat arrangement according to an exemplary embodiment of the present invention in a second configuration.

Figure 1:
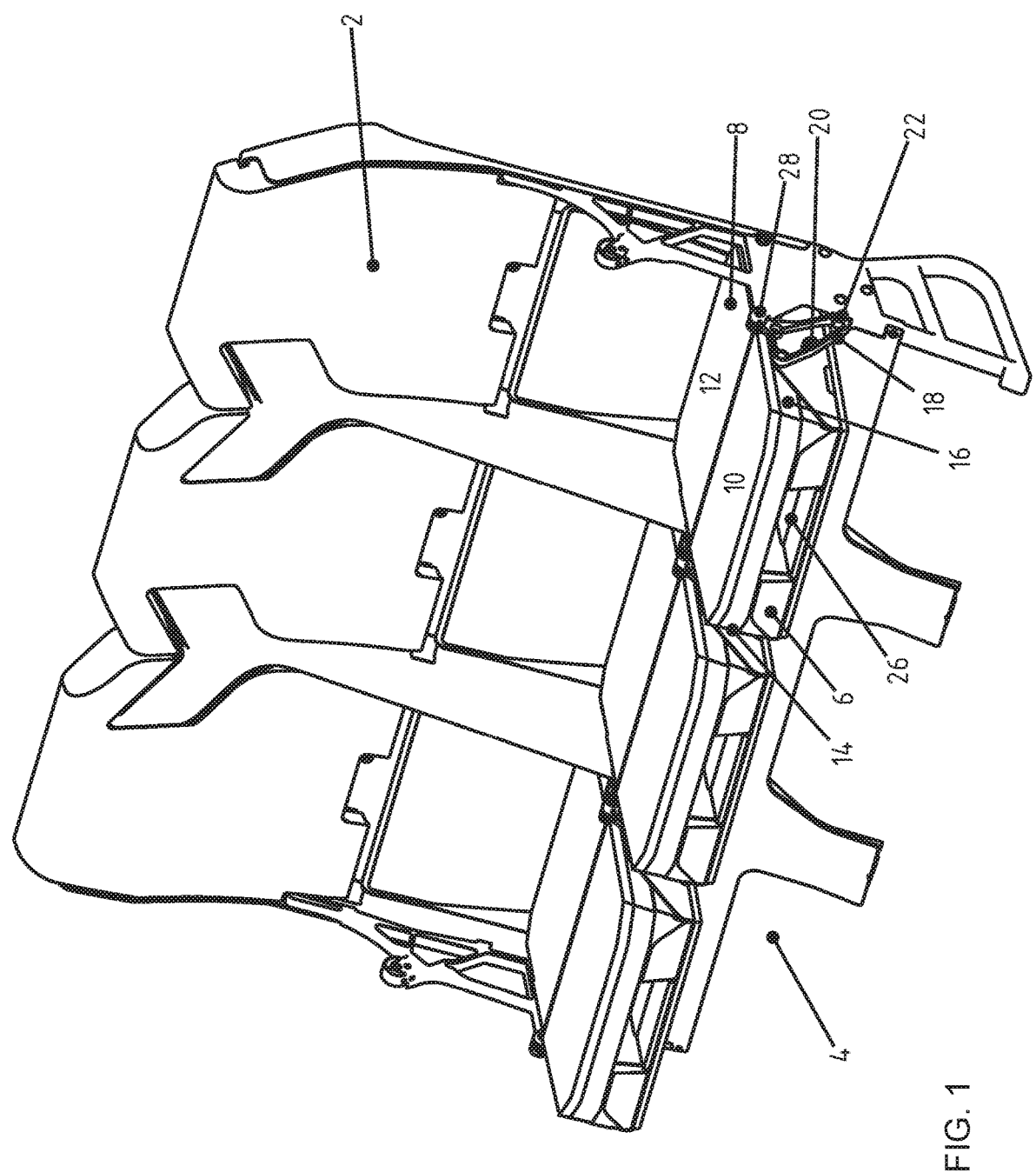
Figure 4:
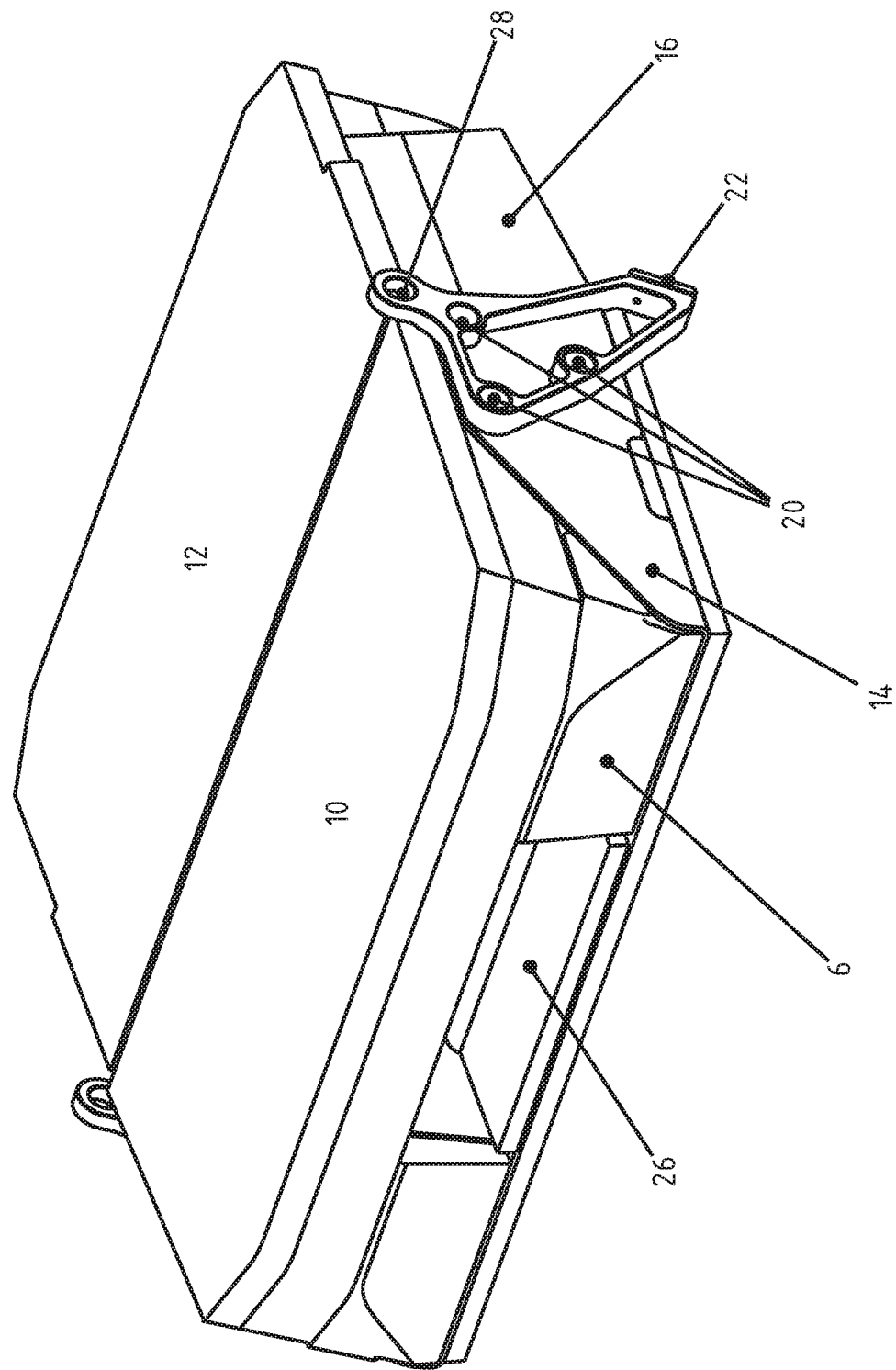
FIG. 4 is a schematic perspective view of the forward and rearward seat portions particularly of the embodiment presented in FIG. 2a in the first configuration.

Referring to FIG. 1, a complete aircraft seat assembly is presented made up of three individual passenger seating areas. The aircraft seat arrangement comprises a backrest 2, a support structure generally indicated by reference 4, and a forward and rearward seat portion 6, 8. In the first configuration as represented in FIG. 1 and FIG. 4 the forward and rearward seat portion seat 6, 8, are in a side-by-side configuration defining a forward seating surface 10 and rearward seating surface 12. The forward and rearward seat portions 6, 8, comprise spaced apart side edges 14, 16, wherein a bracket 18 is secured to the side edge of the forward seat portion 6 by fixing elements 20. In the first configuration, a stop portion 22 abuts the seat support structure 4 at an abutment surface 24. It will be appreciated that first and second brackets 18 are provided adjacent to opposing side edges of the forward seat portion 6 and in the first configuration where the forward and rearward seat portion 6, 8, are in a side-by-side configuration a force applied to the forward seating surface 10 is applied directly through the seat support structure via the stop portion 22 and bracket 18. Visible in the first configuration is a pocket 26 into which is received a lifejacket and/or other safety or passenger equipment.

In plan view the forward seating surface and rearward seating surface 10, 12, project a footprint downwardly onto the aircraft floor. As is visible in FIGS. 1 and 2 a void is provided within the seat footprint that defines a standing space for a person clearly presented in FIGS. 2a and 2b. As clear from FIG. 1 in the exemplary embodiment there is no support structure directly beneath a portion of the leading edge of the forward seat portion 6 and the leading edge of the forward seat portion 6 overhangs the support structure 4. In the exemplary embodiment the forward seat portion 6 is unsupported from underneath via the support structure 4. Instead, the forward seat portion 6 is supported by the bracket 18. The stop portion 22 abuts the support structure 4. As is visible in FIG. 2b, cross member 23 forms part of the support structure increasing stiffness of the seat. It will be appreciated that a passenger can still occupy the space defined within the seat footprint by standing on or either side of the cross member 23. The cross member 23 is spaced apart vertically from the forward and rearward seat portions 6, 8.

Figure 2A:
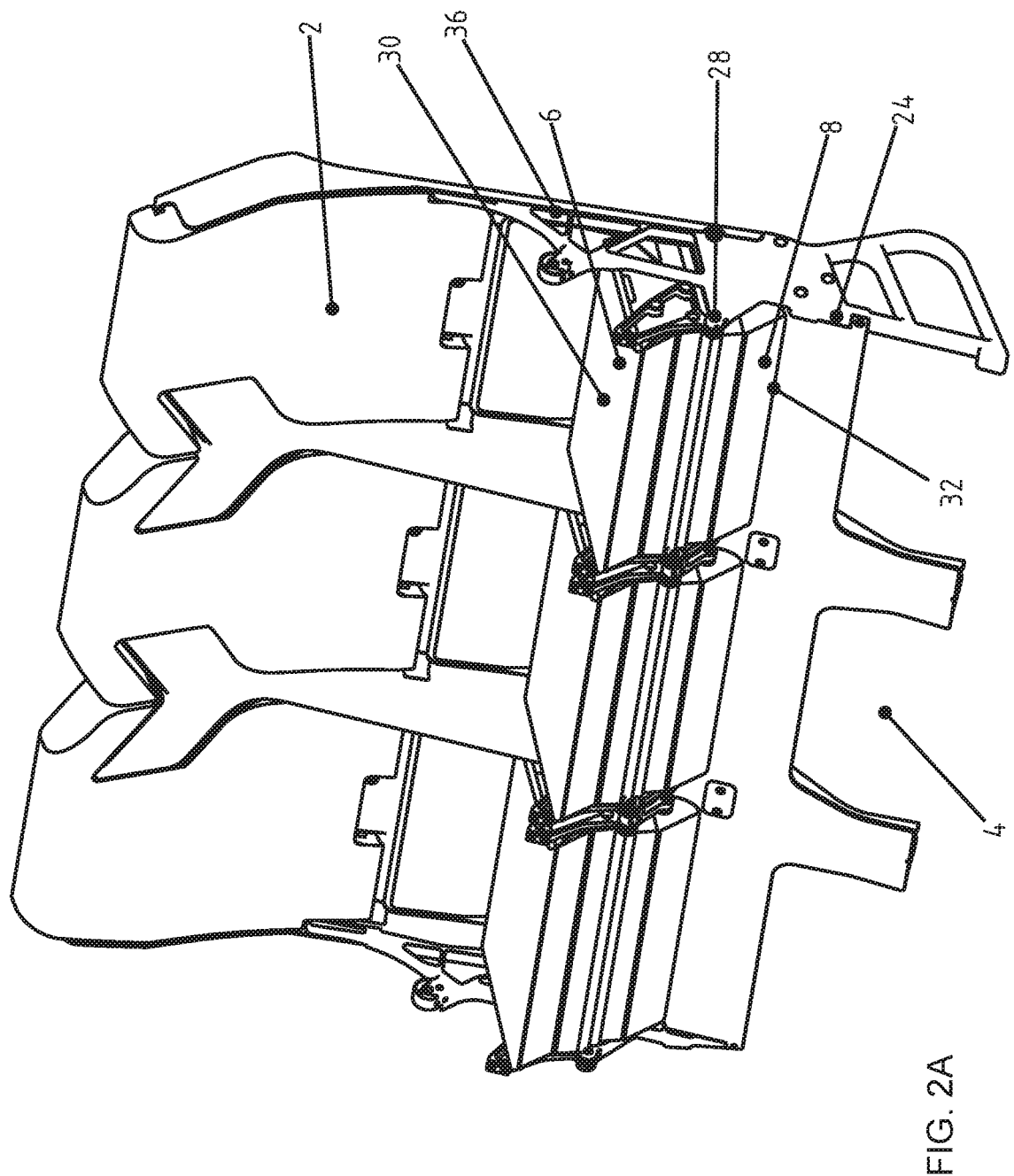
Figure 2B:
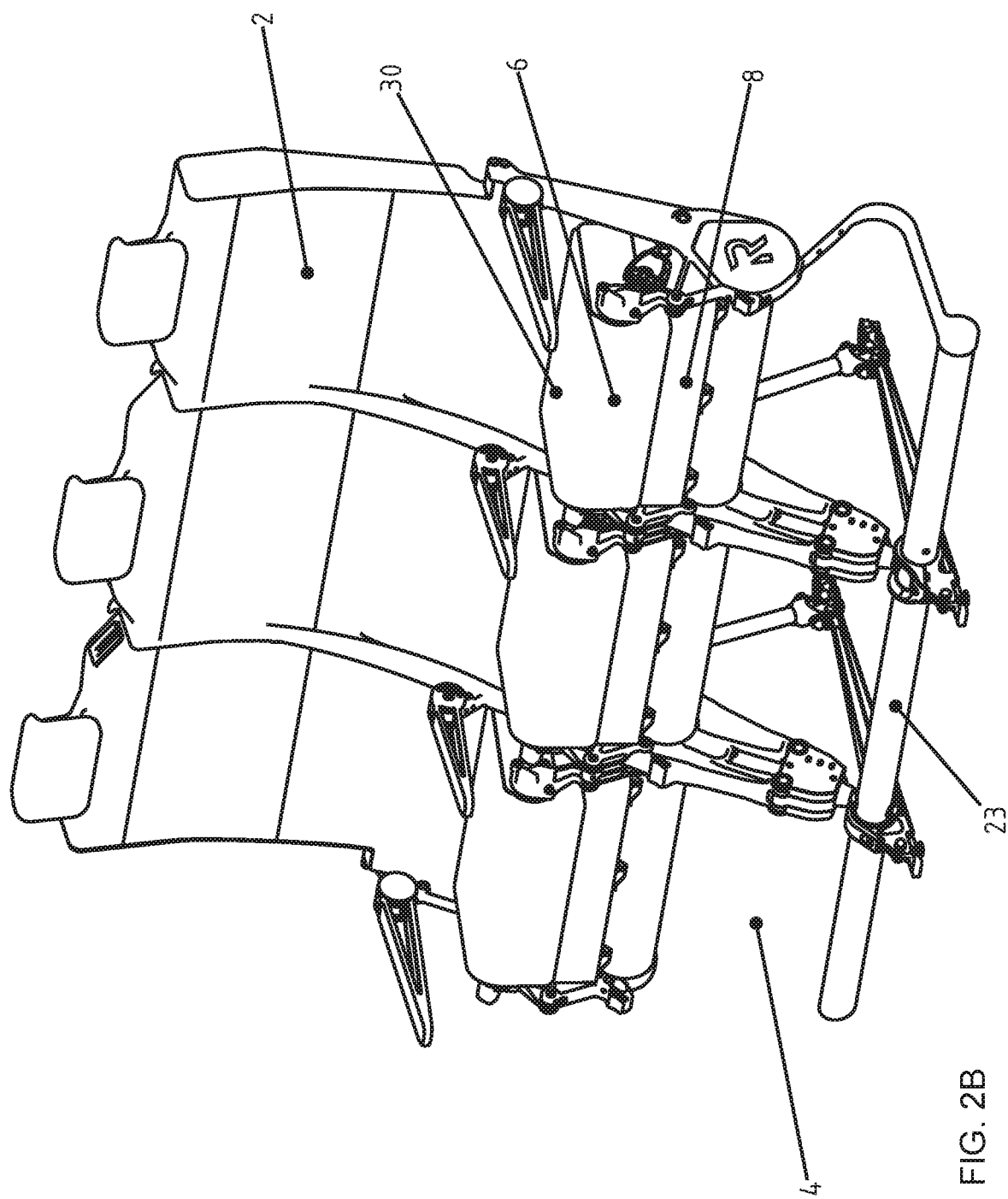
Figure 3:
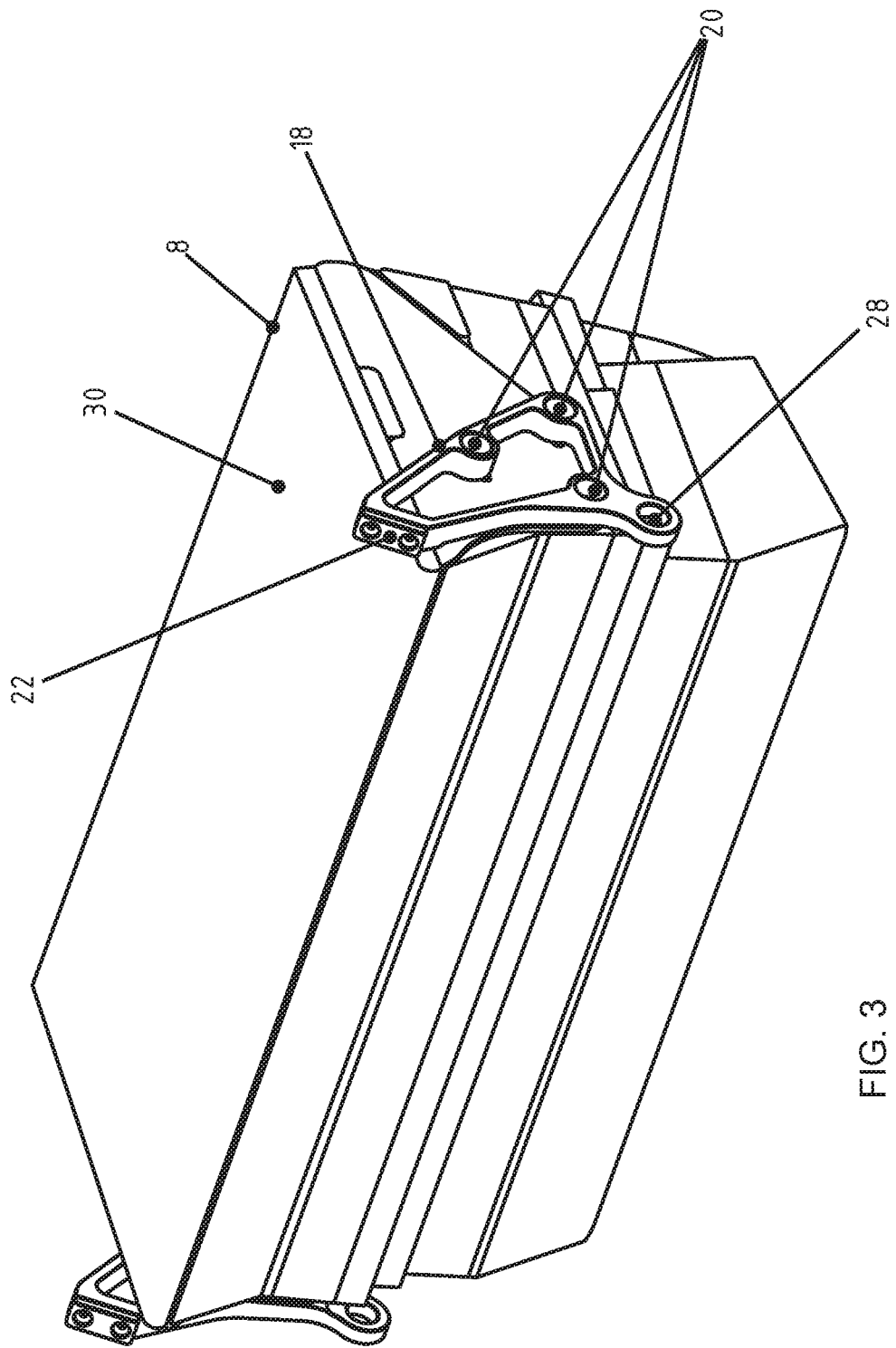
FIG. 3 is a schematic perspective view showing in more detail the forward and rearward seat portions, particularly of the embodiment of FIG. 2a in the second configuration.

Referring now in particular to FIGS. 2a and b and also FIG. 4 the forward and rearward seat portions 6, 8, are in a second configuration wherein the forward seat portion 6 is displaced to be at least partially above the rearward seat portion 8. In the exemplary embodiment the bracket 18 pivots about pivot point 28 of the support structure 4 to the configuration wherein the forward surface seating 10 and rearward seating surface 12 are facing each other. The forward seat portion in this configuration defines a second forward seating surface 30. In this configuration a standing space for a person is defined or the seat can be used for a child. The rearward seat portion 8 is supported underneath by a platform 32 provided as part of the support structure. The platform 32 beneficially extends from the backrest 2 and is integrally formed therewith. Force therefore applied onto the rearward seat portion 8 is transferred directly to the support structure 4.

A mounting point 36 is provided for mounting an armrest relative thereto. Mounting points for a three point harness are also provided wherein one of the mounting positions is closer to the upper edge of the backrest than to the seat portions.

In use, the forward seat portion 6 can be pivoted between the first and second configurations by a passenger dependent upon their desired use.

The present invention has been described by way of example only and it will be appreciated to the addressee that modifications and variations may be made without departing from the scope of protection afforded by the appended claims.

The invention claimed is:

1. An aircraft seat arrangement, comprising:
   a seat having a forward seat portion and a rearward seat portion, the forward seat portion being reconfigurable between a first configuration and a second configuration, the forward seat portion having a trailing edge towards the rearward seat portion and an opposing leading edge;
   a seat support structure comprising a platform for supporting the seat above a floor;
   a backrest, the platform extending forwardly from the backrest and not extending beyond the trailing edge of the forward seat portion, and the rearward seat portion being supported from underneath by the platform;
   wherein in the first configuration, the forward seat portion is in a side by side configuration with the rearward seat portion; and
   wherein in the second configuration, the forward seat portion is displaced to be at least partially above the rearward seat portion.

2. The aircraft seat arrangement according to claim 1, wherein the seat defines a seat footprint in the first configuration, and wherein the seat support structure is arranged such that in the second configuration a standing space for a person is defined within the seat footprint.

3. The aircraft seat arrangement according to claim 1, wherein there is no support structure directly beneath a portion of the leading edge.

4. The aircraft seat arrangement according to claim 3, wherein the forward seat portion defines a footprint in the first configuration, and wherein there is no support structure beneath a majority of the forward seat portion footprint.

5. The aircraft seat arrangement according to claim 3, wherein the leading edge of the forward seat portion overhangs the support structure.

6. The aircraft seat arrangement according to claim 5, wherein a majority of the forward seat portion overhangs the support structure.

7. The aircraft seat arrangement according to claim 1, wherein the forward seat portion has a forward seating surface and the rearward seat portion has a rearward seating surface, and the forward seat portion is displaceable such that in the second configuration the forward seating surface and rearward seating surface are facing each other.

8. The aircraft seat arrangement according to claim 7, wherein the forward seat portion is pivotally mounted relative to the rearward seat portion.

9. The aircraft seat arrangement according to claim 1, wherein the forward seat portion is secured to a bracket, and the bracket is pivotally mounted to the support structure.

10. The aircraft seat arrangement according to claim 9, wherein the bracket comprises a stop portion for abutting the support structure in the first configuration.

11. The aircraft seat arrangement according to claim 1, wherein the platform is integrally formed with the backrest.

12. The aircraft seat arrangement according to claim 1, wherein the rearward seat portion is received in a channel defined by the backrest, the platform and the trailing edge of the forward seat portion.

13. The aircraft seat arrangement according to claim 12, wherein the rearward seat portion is releasably received in the channel.

14. The aircraft seat arrangement according to claim 1, wherein the support structure comprises a plurality of support legs comprising at least one forward support leg and at least one rearward support leg, the forward support leg extending from a location rearward of the leading edge of the forward seat portion.

15. The aircraft seat arrangement according to claim 1, wherein the support structure comprises a plurality of support legs comprising at least one forward support leg and at least one rearward support leg, the at least one forward leg being forwardly projecting.

16. The aircraft seat arrangement according to claim 1, wherein the support structure comprises a plurality of support legs comprising a first and second forward support leg and at least one rearward support leg, each forward support leg comprising a longitudinal length and having a distal end, each distal end comprising an anchoring structure for anchoring the forward support legs to the floor of an aircraft, wherein the seat support structure further comprises a support member extending between the anchoring structures of the first and second forward support legs.

17. An aircraft seat arrangement, comprising:
- a plurality of adjoined seats in a side by side configuration, each seat comprising;
- a forward seat portion and a rearward seat portion, the forward seat portion being reconfigurable between a first configuration and a second configuration, the forward seat portion having a trailing edge towards the rearward seat portion and can opposing leading edge;
- wherein in the first configuration, the forward seat portions in a side by side configuration with the rearward seat portion;
- wherein in the second configuration, the forward seat portion is displaced to be at least partially above the rearward seat portion;
- a seat support structure comprising a platform for supporting the plurality of adjoined seats above a floor; and
- a backrest, the platform extending forwardly from the backrest and not extending beyond the trailing edge of the forward seat portion, and the rearward seat portion being supported from underneath by the platform.

18. The aircraft seat arrangement according to claim 17, wherein the seat support structure comprises a plurality of support legs comprising at least one forward support leg and at least one rearward support leg, the at least one forward support leg extending from intermediate adjoined seats.

* * * * *